(12) United States Patent
Gallier

(10) Patent No.: US 10,458,251 B2
(45) Date of Patent: Oct. 29, 2019

(54) AIRFOIL COOLING USING NON-LINE OF SIGHT HOLES

(71) Applicant: General Electric Company, Schenectady, NY (US)

(72) Inventor: Kirk Douglas Gallier, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 885 days.

(21) Appl. No.: 15/130,013

(22) Filed: Apr. 15, 2016

(65) Prior Publication Data

US 2017/0342842 A1 Nov. 30, 2017

(51) Int. Cl.
| | |
|---|---|
| *F01D 5/14* | (2006.01) |
| *F01D 5/18* | (2006.01) |
| *B23P 15/04* | (2006.01) |
| *B28B 1/30* | (2006.01) |
| *B28B 11/12* | (2006.01) |
| *F01D 5/28* | (2006.01) |
| *F01D 9/04* | (2006.01) |

(52) U.S. Cl.
CPC .............. *F01D 5/186* (2013.01); *B23P 15/04* (2013.01); *B28B 1/30* (2013.01); *B28B 11/12* (2013.01); *F01D 5/187* (2013.01); *F01D 5/282* (2013.01); *F01D 5/284* (2013.01); *F01D 9/041* (2013.01); *B23P 2700/06* (2013.01); *F05D 2220/32* (2013.01); *F05D 2230/50* (2013.01); *F05D 2240/128* (2013.01); *F05D 2240/30* (2013.01); *F05D 2260/202* (2013.01); *F05D 2260/203* (2013.01); *F05D 2300/6033* (2013.01); *Y02T 50/672* (2013.01); *Y02T 50/673* (2013.01); *Y02T 50/676* (2013.01)

(58) Field of Classification Search
CPC ...................................................... F01D 5/186
See application file for complete search history.

(56) References Cited

U.S. PATENT DOCUMENTS

| | | | | |
|---|---|---|---|---|
| 3,698,834 A | * | 10/1972 | Meginnis ................ | F01D 5/184 416/231 R |
| 4,384,823 A | * | 5/1983 | Graham ................... | F01D 5/186 415/115 |

(Continued)

OTHER PUBLICATIONS

Extended European Search Report and Opinion issued in connection with corresponding EP Application No. 17165703.4 dated Sep. 13, 2017.

*Primary Examiner* — Woody A Lee, Jr.
*Assistant Examiner* — Jason A Fountain
(74) *Attorney, Agent, or Firm* — Dority & Manning, P.A.

(57) ABSTRACT

An airfoil for a gas turbine engine is provided that includes a first portion formed from a first plurality of plies of a ceramic matrix composite material and defining an inner surface of the airfoil, as well as a second portion formed from a second plurality of plies of a ceramic matrix composite material and defining an outer surface of the airfoil. The first portion and the second portion define a non-line of sight cooling aperture extending from the inner surface to the outer surface of the airfoil. In one embodiment, a surface angle that is less than 45° is defined between a second aperture and the outer surface. A method for forming an airfoil for a gas turbine engine also is provided.

16 Claims, 10 Drawing Sheets

(56) References Cited

U.S. PATENT DOCUMENTS

| | | | | |
|---|---|---|---|---|
| 5,486,093 A | * | 1/1996 | Auxier | F01D 5/186 |
| | | | | 416/97 R |
| 6,234,755 B1 | | 5/2001 | Bunker et al. | |
| 6,383,602 B1 | | 5/2002 | Fric et al. | |
| 2007/0140835 A1 | * | 6/2007 | Albrecht | F01D 5/147 |
| | | | | 415/115 |
| 2011/0143162 A1 | | 6/2011 | Merrill et al. | |

* cited by examiner

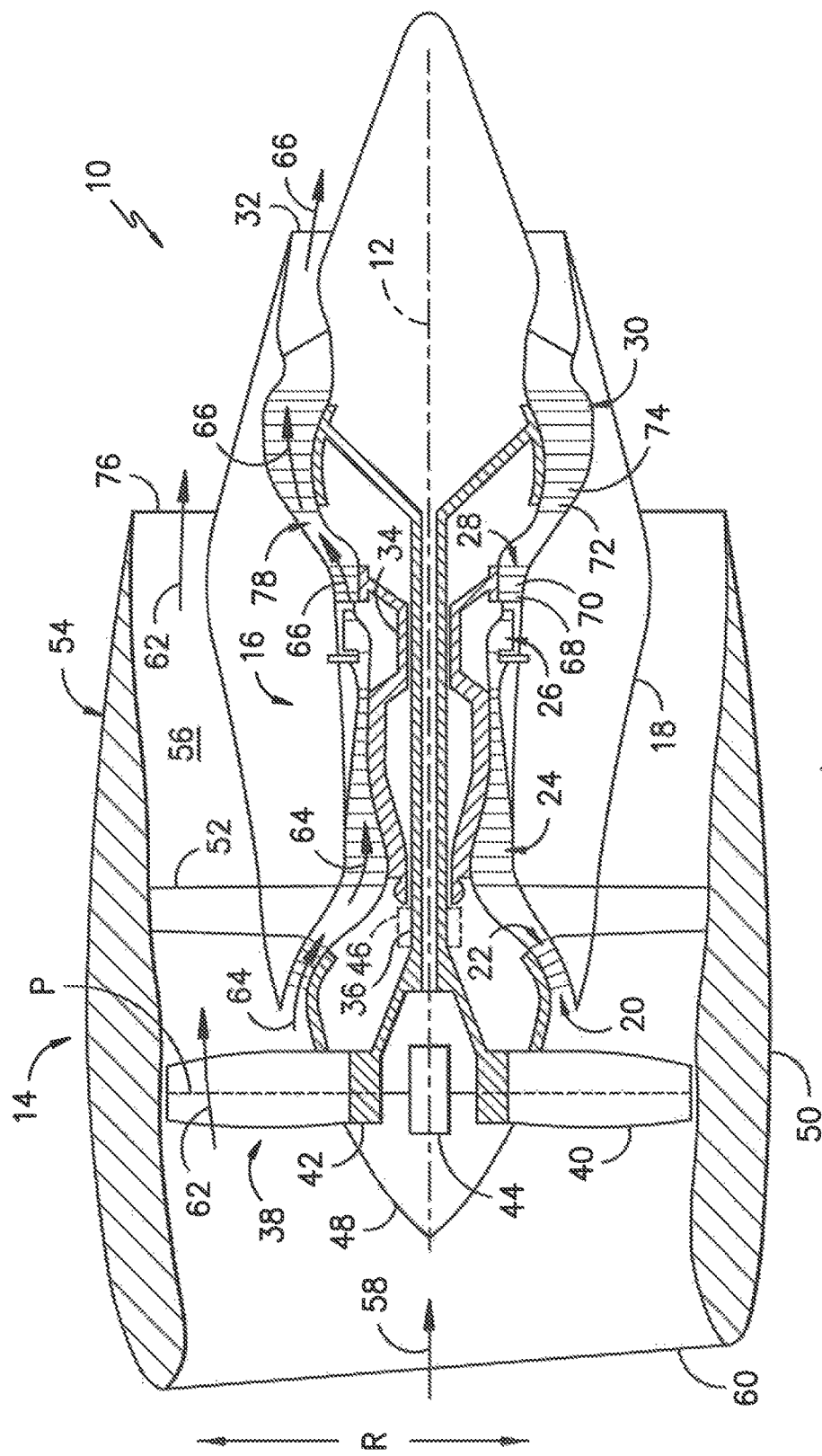
FIG. -1-

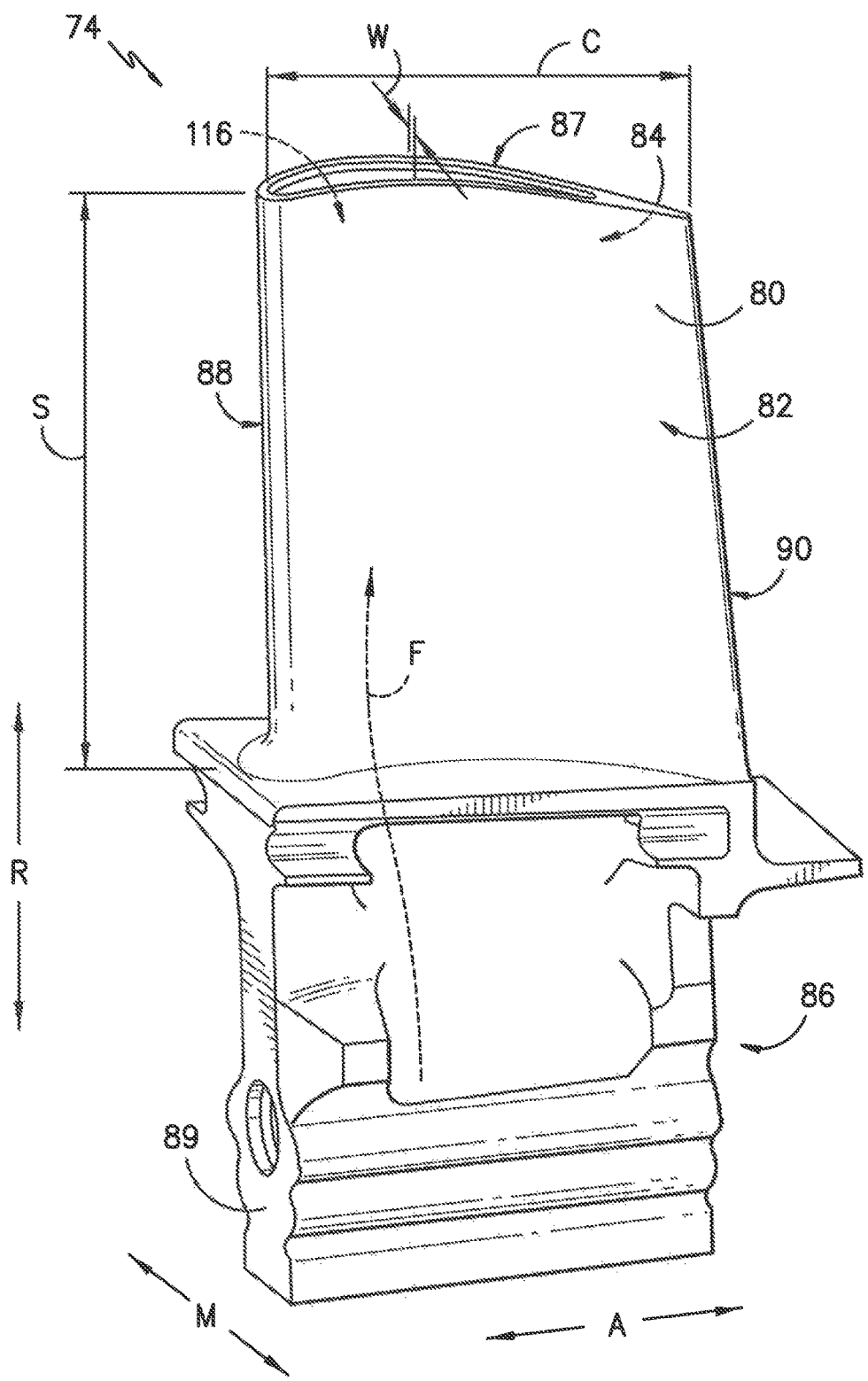
FIG. -2-

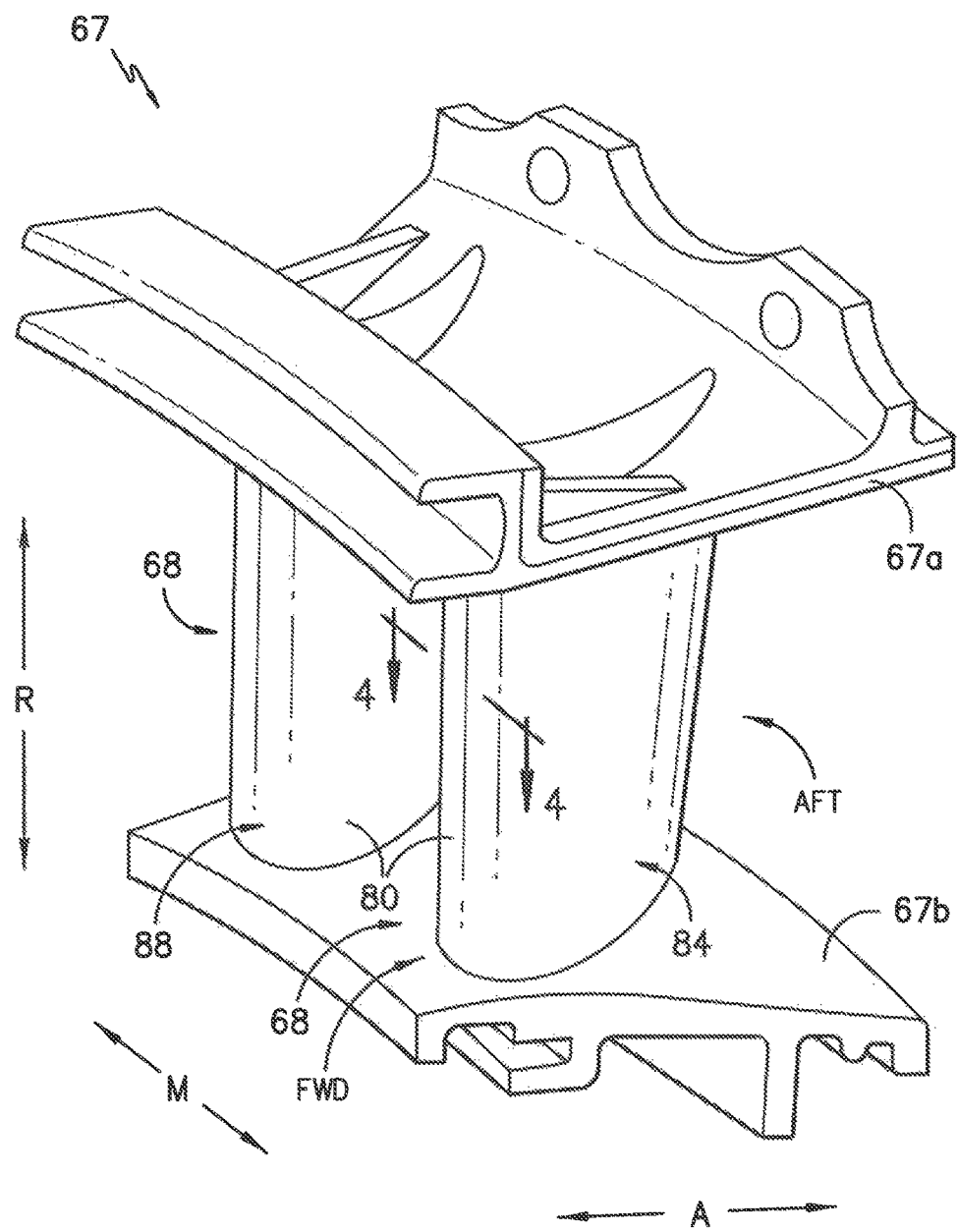
FIG. -3-

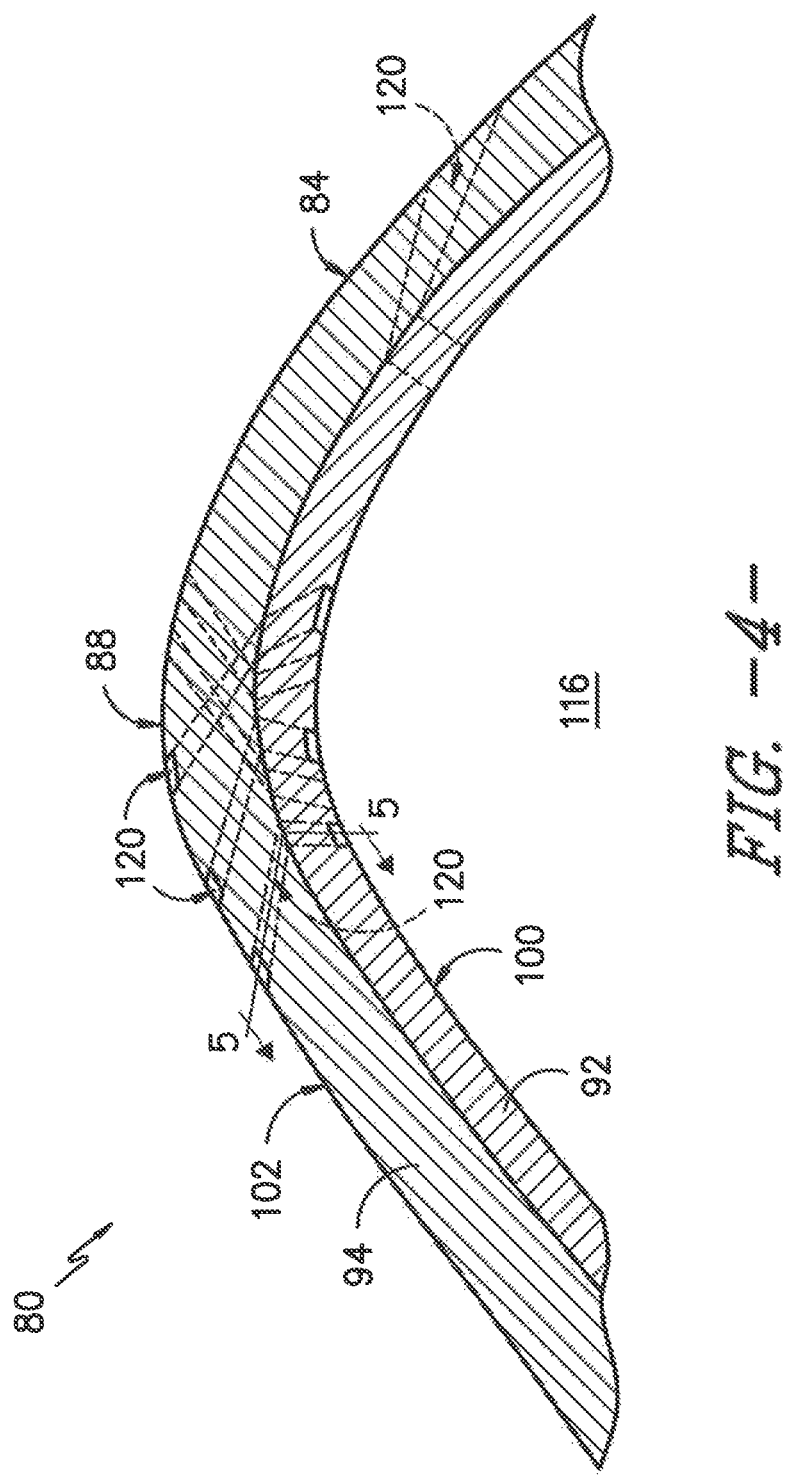
FIG. -4-

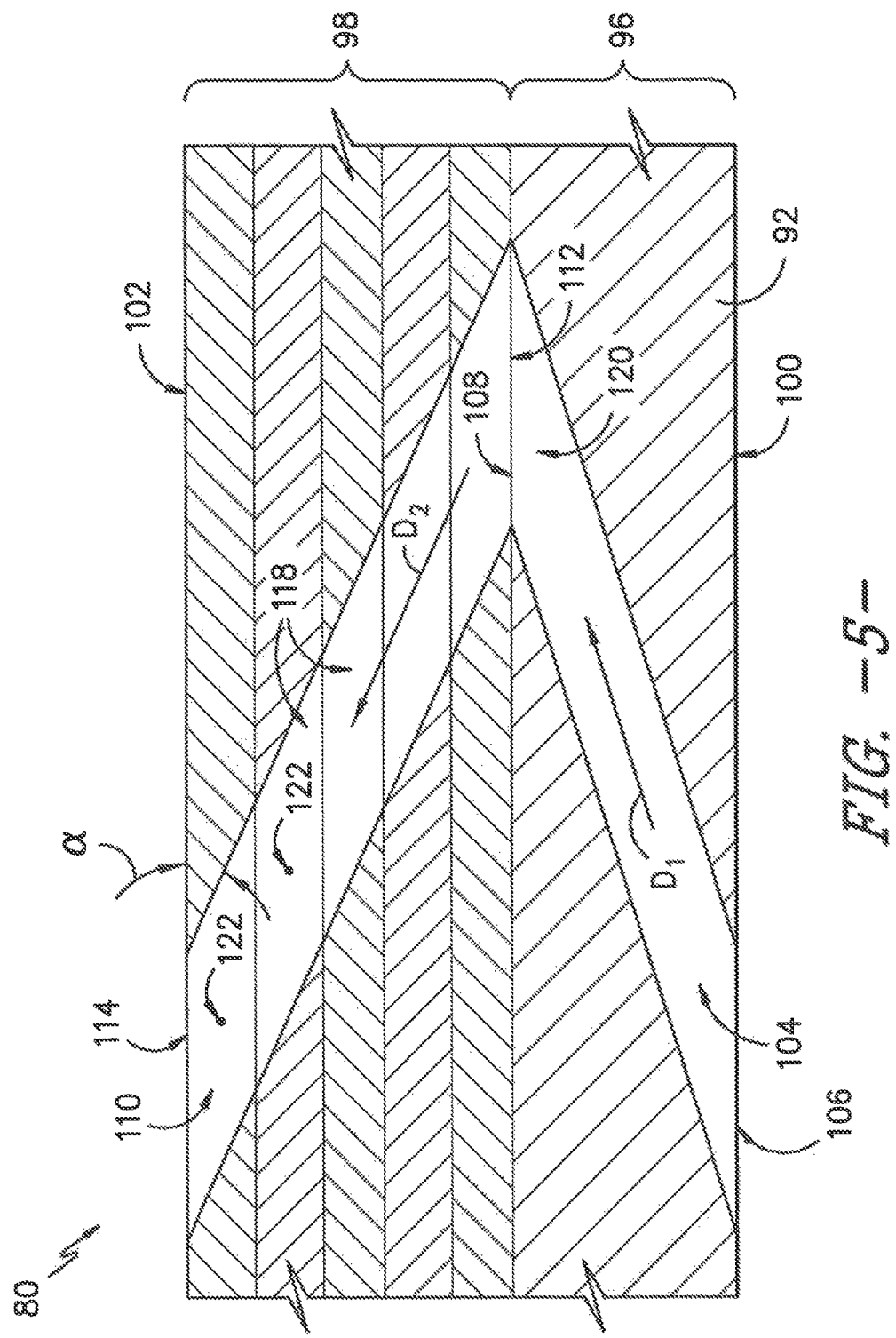
FIG. -5-

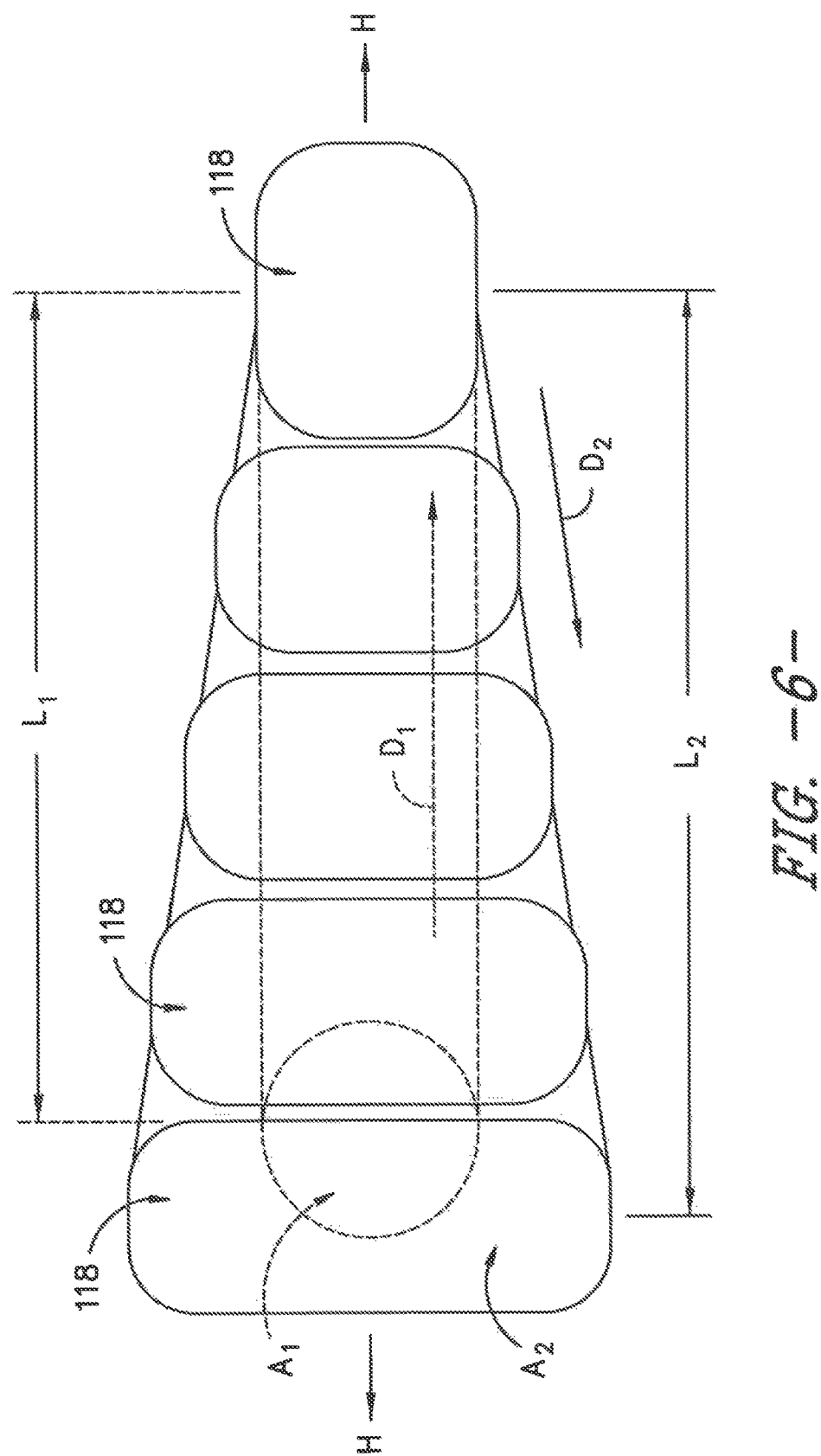
FIG. -6-

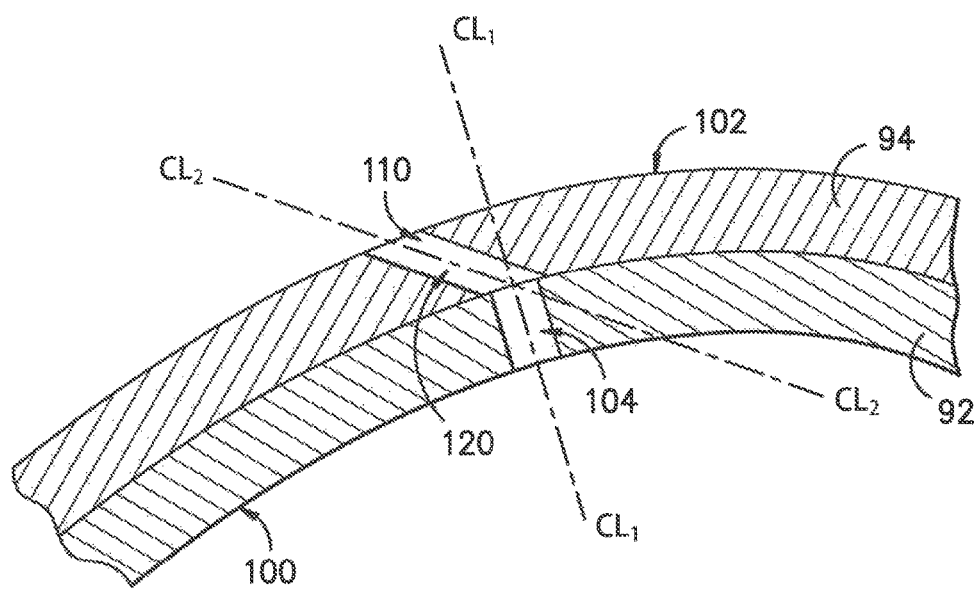
FIG. -7-
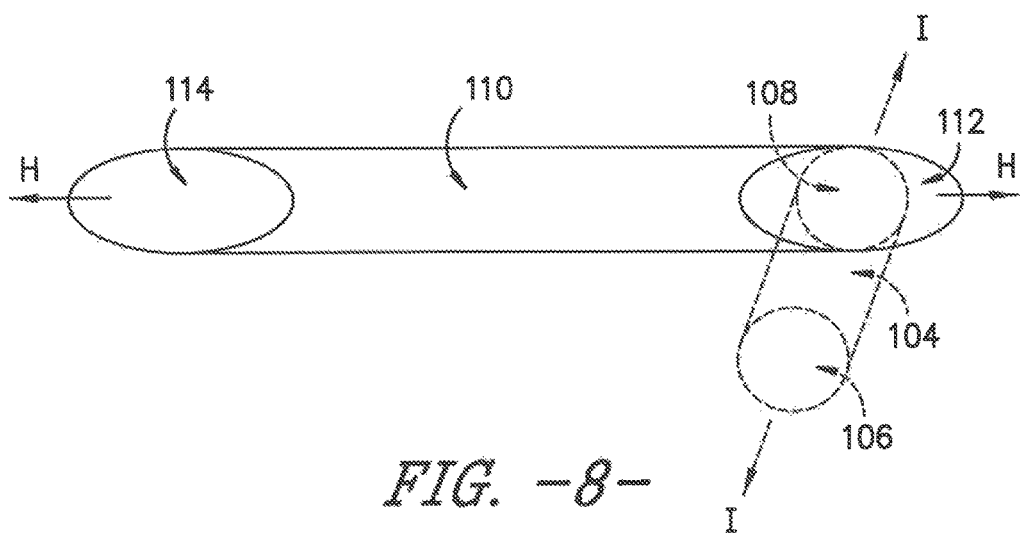
FIG. -8-

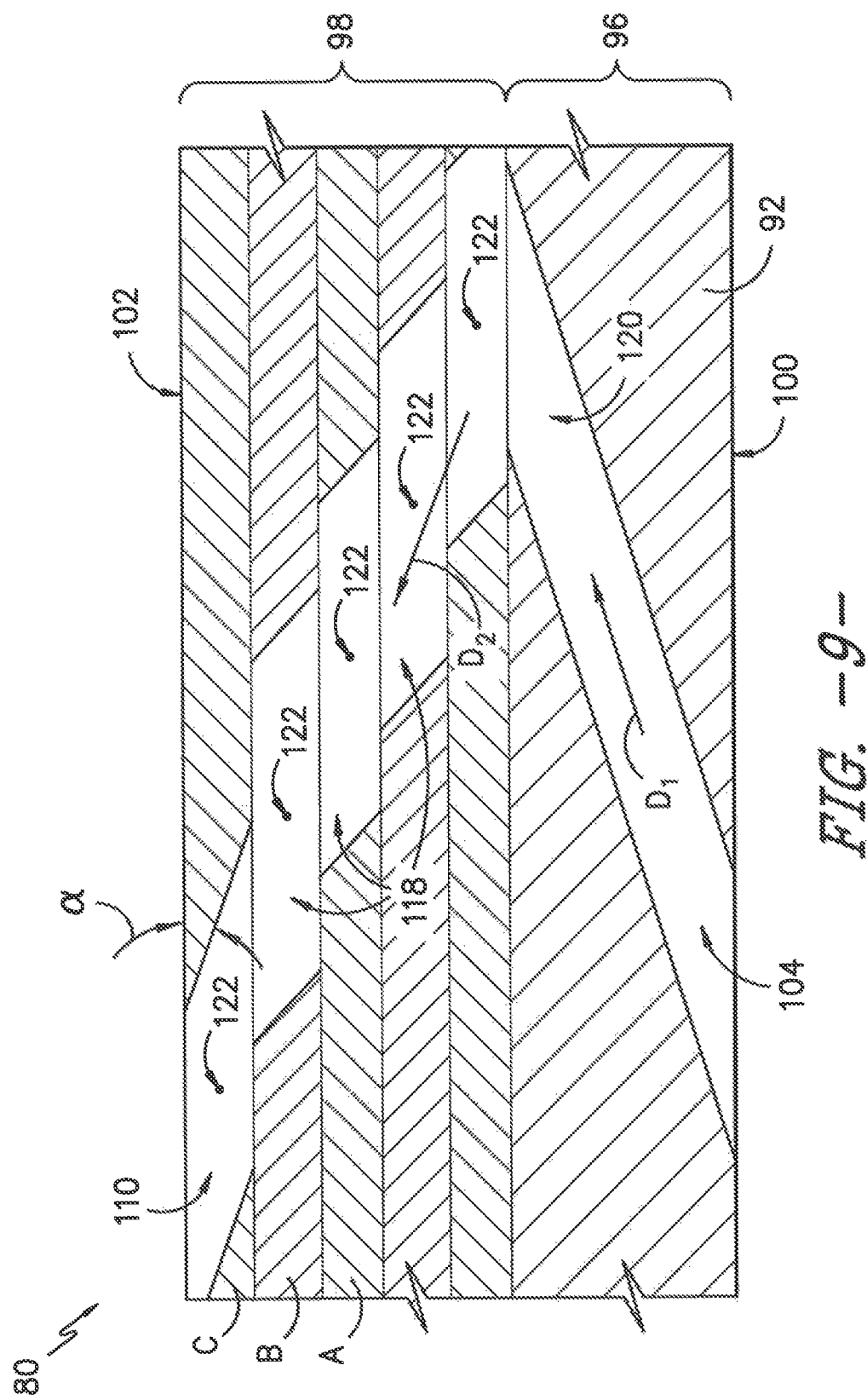

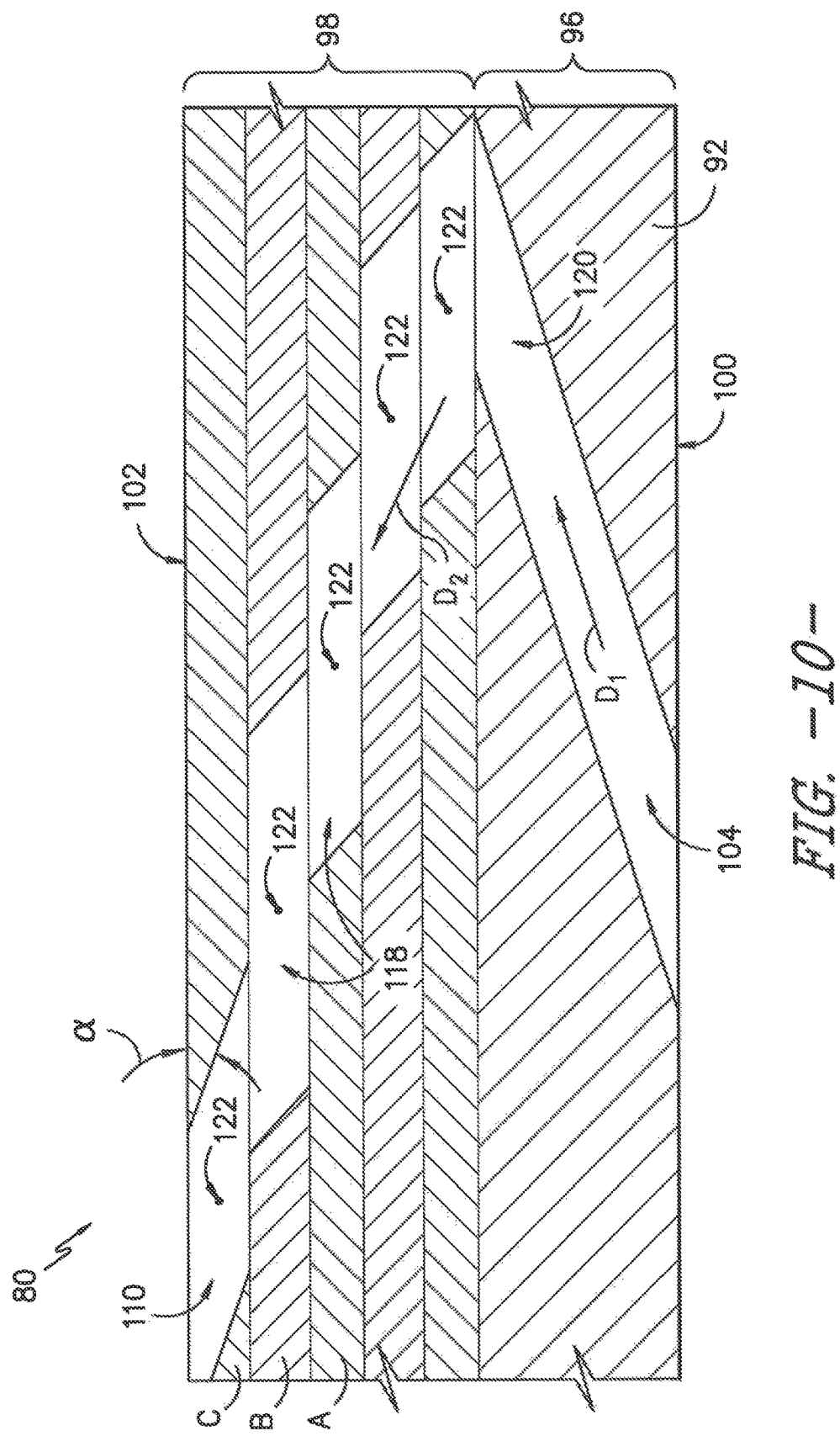
FIG. -10-

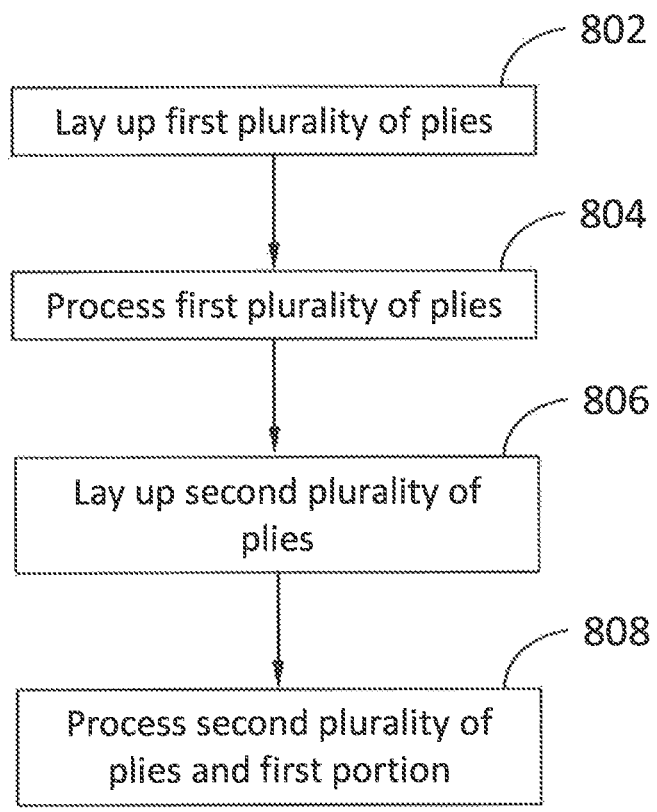
FIG. -11-

AIRFOIL COOLING USING NON-LINE OF SIGHT HOLES

FIELD OF THE INVENTION

The present subject matter relates generally to a gas turbine engine, or more particularly to features for cooling internal components of gas turbine engines. Most particularly, the present subject matter relates to non-line of sight cooling holes for gas turbine engine airfoils.

BACKGROUND OF THE INVENTION

A gas turbine engine generally includes a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

In general, turbine performance and efficiency may be improved by increased combustion gas temperatures. However, increased combustion temperatures can negatively impact the gas turbine engine components, for example, by increasing the likelihood of material failures. Thus, while increased combustion temperatures can be beneficial to turbine performance, some components of the gas turbine engine may require cooling features or reduced exposure to the combustion gases to decrease the negative impacts of the increased temperatures on the components.

Film cooling gas turbine engine components, e.g., by directing a flow of cooler fluid over the surface of the component, can help reduce the negative impacts of elevated combustion temperatures. For example, cooling apertures may be provided throughout a component; the cooling apertures may allow a flow of cooling fluid from within the component to be directed over the outer surface of the component. However, in areas of high curvature of the component, it can be difficult to direct the flow of cooling fluid from the cooling apertures over the outer surface of the component to form a cooling film of fluid. Further, known methods of forming cooling apertures, e.g., by boring or otherwise machining apertures in the component, can be ineffective in producing optimal cooling aperture lengths for controlling bore cooling and in producing cooling apertures having optimal fluid exit surface angles. In addition, known methods of machining cooling apertures are prone to through-hole scarfing and often present challenges to properly positioning the cooling apertures.

Therefore, improved cooling features for gas turbine components that overcome one or more disadvantages of existing cooling features would be desirable. In particular, an airfoil for a gas turbine engine having features for reducing an angle between a cooling aperture and an outer surface of the airfoil to reduce a surface angle of cooling fluid exiting the cooling aperture would be beneficial. Further, an airfoil having a cooling aperture including a change in direction between a first section and a second section of the cooling aperture would be advantageous. Additionally, a method for forming an airfoil for a gas turbine engine, the airfoil having features for improved surface cooling of the airfoil, would be useful.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, an airfoil for a gas turbine engine is provided. The airfoil includes a first portion defining an inner surface of the airfoil. The first portion is formed from a first plurality of plies of a ceramic matrix composite material. The airfoil also includes a second portion defining an outer surface of the airfoil. The second portion is formed from a second plurality of plies of a ceramic matrix composite material. The first portion and the second portion define a non-line of sight cooling aperture extending from the inner surface to the outer surface of the airfoil.

In another exemplary embodiment of the present disclosure, an airfoil for a gas turbine engine is provided. The airfoil includes a first portion defining an inner surface of the airfoil. The first portion is formed from a first plurality of plies of a ceramic matrix composite material. The airfoil also includes a second portion defining an outer surface of the airfoil. The second portion is formed from a second plurality of plies of a ceramic matrix composite material. The first portion defines a first aperture and the second portion defines a second aperture. The first aperture and the second aperture extend along different directions and define a cooling aperture forming a continuous pathway through the airfoil from the inner surface to the outer surface. Further, a surface angle is defined between the second aperture and the outer surface. The surface angle is less than 45°.

In a further exemplary embodiment of the present disclosure, a method for forming an airfoil for a gas turbine engine is provided. The method includes laying up a first plurality of plies of a ceramic matrix composite material; processing the first plurality of plies to form a first portion of the airfoil; laying up a second plurality of plies of a ceramic matrix composite material, the second plurality of plies laid up on the first portion of the airfoil; and processing the second plurality of plies and the first portion to form a second portion of the airfoil adjacent the first portion. The first and second portions define a non-line of sight cooling aperture.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 provides a schematic cross-sectional view of an exemplary gas turbine engine according to various embodiments of the present subject matter.

FIG. 2 provides a side, perspective view of a turbine rotor blade according to an exemplary embodiment of the present subject matter.

FIG. 3 provides a perspective view of a turbine nozzle segment according to an exemplary embodiment of the present subject matter.

FIG. 4 provides a cross-section view of a portion of an airfoil of the turbine nozzle segment, taken along the line 4-4 of FIG. 3, according to an exemplary embodiment of the present subject matter.

FIG. 5 provides a cross-section view of the portion of the airfoil of the turbine nozzle segment of FIG. 4, taken along the line 5-5 of FIG. 4 through a cooling aperture of the airfoil, according to an exemplary embodiment of the present subject matter.

FIG. 6 provides a plan view of the cooling aperture of FIG. 5 according to an exemplary embodiment of the present subject matter.

FIG. 7 provides the cross-section view through the cooling aperture of the airfoil shown in FIG. 5 according to another exemplary embodiment of the present subject matter.

FIG. 8 provides a plan view of the cooling aperture of FIG. 7 according to an exemplary embodiment of the present subject matter.

FIG. 9 provides a cross-section view of a portion of the airfoil of the turbine nozzle segment of FIG. 3 according to an exemplary embodiment of the present subject matter.

FIG. 10 provides a cross-section view of a portion of the airfoil of the turbine nozzle segment of FIG. 3 according to another exemplary embodiment of the present subject matter.

FIG. 11 provides a chart illustrating a method for forming an airfoil of a gas turbine engine according to an exemplary embodiment of the present subject matter.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows and "downstream" refers to the direction to which the fluid flows.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the depicted embodiment, fan section 14 includes a variable pitch fan 38 having a plurality of fan blades 40 coupled to a disk 42 in a spaced apart manner. As depicted, fan blades 40 extend outward from disk 42 generally along the radial direction R. Each fan blade 40 is rotatable relative to disk 42 about a pitch axis P by virtue of the fan blades 40 being operatively coupled to a suitable actuation member 44 configured to vary the pitch of the fan blades 40. Fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters turbofan 10 through an associated inlet 60 of the nacelle 50 and/or fan section 14. As the volume of air 58 passes across fan blades 40, a first portion of the air 58 as indicated by arrows 62 is directed or routed into the bypass airflow passage 56 and a second portion of the air 58 as indicated by arrows 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

In some embodiments, components of turbofan engine 10, particularly components within hot gas path 78, may comprise a ceramic matrix composite (CMC) material, which is a non-metallic material having high temperature capability. Exemplary CMC materials utilized for such components may include silicon carbide, silicon, silica, or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). As further examples, the CMC materials may also include silicon carbide (SiC) or carbon fiber cloth.

CMC materials may be used for various components of the engine, for example, airfoils in the turbine, compressor, and/or fan regions. The compressor and turbine generally include rows of airfoils that are stacked axially in stages. Each stage includes a row of circumferentially spaced stator vanes and a rotor assembly that rotates about centerline 12 of engine 10. Turbine nozzles, comprising stator vanes extending between inner and outer bands, direct the hot combustion gas in a manner to maximize extraction at the adjacent downstream turbine blades. In various embodiments of engine 10, the nozzles and/or turbine blades, including their associated airfoils, may be CMC components. Of course, other components of turbine engine 10 also may be formed from CMC materials.

Referring now to FIG. 2, a side, perspective view of a turbine rotor blade 74 is provided according to an exemplary embodiment of the present subject matter. As previously described, LP turbine 30 includes sequential stages of turbine stator vanes 72 coupled to outer casing 18 and turbine rotor blades 74 coupled to shaft or spool 36. Each blade 74 includes an airfoil 80 having a pressure side 82 opposite a suction side 84. Opposite pressure and suction sides 82, 84 of each airfoil 80 extend radially along a blade span S from a blade root 86 to a blade tip 87. As depicted, blade root 86 is the radially innermost portion of blade 74 and the blade tip is the radially outermost portion of blade 74. Moreover, as further shown in FIG. 2, pressure and suction sides 82, 84 of airfoil 80 extend axially between a leading edge 88 and an opposite trailing edge 90. Airfoil 80 defines a chord C extending axially between opposite leading and trailing edges 88, 90. Moreover, airfoil 80 defines a width W between pressure side 82 and suction side 84. The width W of airfoil 80 may vary along the span S.

Each blade 74 is coupled to shaft or spool 36 via blade root 86. More particularly, blade root 86 is coupled to a turbine rotor disk (not shown), which in turn is coupled to shaft or spool 36 (FIG. 1). It will be readily understood that, as is depicted in FIG. 2 and is generally well-known in the art, blade root 86 may define a projection 89 having a dovetail or other shape for receipt in a complementarily shaped slot in the turbine rotor disk to couple blade 74 to the disk. Of course, each blade 74 may be coupled to the turbine rotor disk and/or shaft or spool 36 in other ways as well. In any event, blades 74 are coupled to the turbine rotor disks such that a row of circumferentially adjacent blades 74 extends radially outward from the perimeter of each disk, i.e., adjacent blades 74 within a blade row are spaced apart from one another along a circumferential direction M and each blade 74 extends from the disk along the radial direction R. As such, the turbine rotor disk and outer casing 18 form an inner end wall and an outer end wall, respectively, of hot gas path 78 through the turbine assembly.

Referring now to FIG. 3, a perspective view is provided of a turbine nozzle segment. A turbine stator is formed by a plurality of turbine nozzle segments that are abutted at circumferential ends to form a complete ring about centerline 12. Each nozzle segment may comprise one or more vanes, such as vanes 68 of HP turbine 28 or vanes 72 of LP turbine 30, that extend between an outer band and an inner band as previously described. FIG. 3 depicts an exemplary turbine nozzle segment 67 of HP turbine 28. Nozzle segment 67 includes outer band 67a and inner band 67b, between which extends stator vanes 68. Each stator vane 68 includes an airfoil 80, which has the same features as airfoil 80 described above with respect to blade 74. For example, airfoil 80 of vane 68 has a pressure side 82 opposite a suction side 84. Opposite pressure and suction sides 82, 84 of each airfoil 80 extend radially along a span from a vane root at inner band 67b to a vane tip at outer band 67a. Moreover, pressure and suction sides 82, 84 of airfoil 80 extend axially between a leading edge 88 and an opposite trailing edge 90. Airfoil 80 further defines a chord extending axially between opposite leading and trailing edges 88, 90. Moreover, airfoil 80 defines a width between pressure side 82 and suction side 84, which may vary along the span.

It will be appreciated that, although airfoil 80 of vane 68 may have the same features as airfoil 80 of blade 74, airfoil 80 of vane 68 may have a different configuration than airfoil 80 of blade 74. As an example, the span of airfoil 80 of vane 68 may be larger or smaller than the span of airfoil 80 of blade 74. As another example, the width and/or chord of airfoil 80 of vane 68 may differ from the width and/or chord of airfoil 80 of blade 74. Additionally or alternatively, airfoils 80 of LP stator vanes 72 and/or airfoils 80 of HP turbine rotor blades 70 may differ in size, shape, and/or configuration from airfoils 80 of HP stator vanes 68 and LP turbine rotor blades 74. However, it also should be understood that, while airfoils 80 may differ in size, shape, and/or configuration, the subject matter described herein may be applied to any airfoil within engine 10, as well as other suitable components of engine 10.

FIG. 4 provides a cross-sectional view of a portion of airfoil 80 of stator vane 68, taken along the line 4-4 of FIG. 3, according to an exemplary embodiment of the present subject matter. FIG. 5 provides a cross-sectional view of a portion of airfoil 80, taken along the line 5-5 of FIG. 4, according to an exemplary embodiment of the present subject matter. As illustrated, airfoil 80 comprises a first portion 92 and a second portion 94. First portion 92 is fabricated from a first plurality of plies 96 of a CMC material and second portion 94 is fabricated from a second plurality of plies 98 of a CMC material. First portion 92 defines an inner surface 100 of airfoil 80, and second portion 94 defines an outer surface 102 of airfoil 80.

Referring still to FIGS. 4 and 5, airfoil 80 defines cooling apertures 120 for providing a flow of cooling fluid over outer surface 102 of airfoil 80. Each cooling aperture 120 comprises a first section and a second section. More particularly, first portion 92 of airfoil 80 defines a first aperture 104 therethrough; first aperture 104 is the first section of cooling aperture 120. First aperture 104 has a first end 106 defined at inner surface 100 and a second end 108 defined at second portion 94 of airfoil 80. First and second ends 106, 108 are spaced apart by a first length $L_1$ (FIG. 5). Further, first aperture 104 extends from its first end 106 to its second end 108 along a first direction $D_1$.

In addition, second portion 94 of airfoil 80 defines a second aperture 110 therethrough; second aperture 110 is the second section of cooling aperture 120. Second aperture 110 has a first end 112 defined adjacent second end 108 of first aperture 104. Second aperture 110 also has a second end 114 defined at outer surface 102 of airfoil 80. First and second ends 112, 114 are spaced apart by a second length $L_2$ (FIG. 6). Second aperture 110 extends from its first end 112 to its second end 114 along a second direction $D_2$.

Referring back to FIG. 4, first portion 92 defines a cavity 116 that receives a flow of cooling fluid F, e.g., a flow of pressurized air diverted from HP compressor 24. The fluid flow F received within cavity 116 generally is cooler than the combustion gases flowing against or over outer surface 102 of airfoil 80. Each cooling aperture 120, extending from cavity 116 to outer surface 102 via first aperture 104 and second aperture 110, forms a continuous pathway in fluid communication with cavity 116 to facilitate flowing cooling fluid F from cavity 116 to outer surface 102. As such, the flow of cooling fluid F over outer surface 102 can help reduce the temperatures to which outer surface 102 is exposed.

As shown in FIG. 4, and more clearly in FIG. 5, first direction $D_1$ is different from second direction $D_2$. The change in direction between first aperture 104 and second aperture 110 provides a non-line of sight cooling aperture 120, i.e., cavity 116 of airfoil 80 cannot be viewed from the exterior of the airfoil via cooling aperture 120, which extends from inner surface 100 to outer surface 102 of airfoil 80. The change in direction allows an angle α between second aperture 110 and outer surface 102 of airfoil 80 to be reduced such that a reduced surface angle α is defined between second aperture 110 and outer surface 102. More particularly, a single direction cooling aperture requires a certain minimum surface angle α for the cooling aperture or hole to be able to extend from inner surface 100 to outer surface 102 and thereby permit a flow of cooling fluid from cavity 116 to outer surface 102 of airfoil 80. That is, in single direction cooling hole configurations, if the angle between the cooling hole and the outer surface of the airfoil is below the minimum value (i.e., too small), the cooling hole will not be able to extend from the outer surface to the inner surface to access the cooling fluid. However, by utilizing first aperture 104 to access cavity 116 and second aperture 110 to access outer surface 102, where first aperture 104 and second aperture 110 extend along different directions yet form a continuous pathway from cavity 116 to outer surface 102, the cooling aperture 120 of the present subject matter permits small surface angles α between the cooling aperture and the outer surface of the airfoil. Preferably, the surface angle α is no greater than, or less than, 45°; that is, the surface angle α defined between second aperture 110 and outer surface 102 is between 0° and 45°. A reduced surface angle can better direct the flow of cooling fluid F exiting cooling aperture 120 along outer surface 102 and thereby improve film effectiveness and, thus, surface cooling of airfoils of gas turbine engine 10.

Further, it will be readily understood that any number of cooling apertures 120 comprising first and second apertures 104, 110 may be used throughout airfoil 80. More specifically, as represented by the dashed lines in FIG. 4, cooling apertures 120 may be defined at various locations along the span S of airfoil 80, i.e., spaced apart over airfoil 80 generally along the radial direction R. Moreover, the change in direction between first aperture 104 and second aperture 110 allows cooling apertures 120 to be particularly beneficial for areas of airfoil 80 having a high curvature, such as leading edge 88, where it may be difficult to direct a flow of cooling fluid over outer surface 102. However, although cooling apertures 120 may be particularly beneficial along leading edge 88 of airfoil 80, cooling apertures 120 may be suitable for any location on airfoil 80 and, for example, may be defined along trailing edge 90 as well as over pressure and suction sides 82, 84 of airfoil 80. Further, cooling apertures 120 also may be defined on a rotor blade platform, as well as along an inner and/or outer wall or band of a nozzle, such as along inner band 67b and/or outer band 67a of nozzle 67 shown in FIG. 3. As such, cooling apertures 120 may be spaced apart generally along the axial direction A as well as the radial direction R. Further, the use of multiple cooling apertures 120 at multiple locations of airfoil 80 may help enhance the surface cooling provided by the cooling fluid flowing from each aperture 120.

Additionally, it will be appreciated that, although described herein as having two sections (first aperture 104 being the first section and second aperture 110 being the second section), in other embodiments cooling apertures 120 may have more than two sections. For example, airfoil 80 may comprise three portions—a first portion defining inner surface 100 and cavity 116, a second portion defined outside the first portion (i.e., defined adjacent the first portion outward of the inner surface 100), and a third portion defined outside the second portion (i.e., defined adjacent the second portion outward of the first portion) and defining outer surface 102. Each portion of airfoil 80 may define an aperture, and each aperture may extend along a different direction or, at the least, extend along two different directions. The aperture of one portion may be defined adjacent the aperture of the adjacent portion to form a continuous pathway, and, thus, a cooling aperture 120, from cavity 116 to outer surface 102. Because the apertures extend along at least two different directions, the cooling aperture 120 is a non-line of sight aperture, with a change in direction of the aperture 120 between inner surface 100 of airfoil 80 and outer surface 102.

Moreover, as will be appreciated from the illustrations of FIGS. 4 and 5, cooling apertures 120 may vary in length. That is, one cooling aperture 120 may have a different overall length, e.g., the sum of first length $L_1$ and second length $L_2$, than another cooling aperture 120. In other embodiments, the length $L_1$ of first aperture 104 and/or the length $L_2$ of second aperture 110 may vary among cooling apertures 120. By varying the length of cooling apertures 120, the cooling can be controlled, i.e., the length of cooling apertures 120 is customizable to accommodate different cooling requirements for different locations of airfoil 80 and to control cooling local to cooling apertures 120.

As illustrated in FIGS. 5 through 8, each ply of second plurality of plies 98 may be cut to define a cut-out 118. The plurality of cut-outs 118 define second aperture 110. Further, although illustrated as a machined bore through first portion 92, it will be appreciated that first aperture 104 similarly may be defined by cut-outs in first plurality of plies 96. That is, as described with respect to second aperture 110, each ply of first plurality of plies 96 may be cut to define a cut-out 118 in the ply, and the plurality of cut-outs 118 in first plies 96 may define first aperture 104. First and second apertures 104, 110 may be defined in other ways as well.

Referring particularly to FIG. 6, a plan view is provided of cooling aperture 120 according to an exemplary embodiment of the present subject matter. As depicted in FIG. 6, first aperture 104 has a first cross-sectional area $A_1$ that is constant over its length $L_1$ from inner surface 100 to second portion 94. Further, in the depicted embodiment, cut-outs 118 forming second aperture 110 have a second cross-sectional area $A_2$ that increases along the length $L_2$ of second aperture 110, i.e., along second direction $D_2$ from first end 112 at first portion 92 to second end 114 at outer surface 102. Conversely, the cross-sectional area $A_2$ of second aperture 110 decreases from its second end 114 to its first end 112. In exemplary embodiments, such as the embodiment shown in FIG. 5, the cross-sectional area $A_2$ of second aperture 110 may increase along second direction $D_2$ from about two times greater or larger than the cross-sectional area $A_1$ of first aperture 104 to about twelve times greater or larger than area $A_1$. That is, the cross-sectional area $A_2$ of the cut-out 118 at outer surface 102 of airfoil 80 may be approximately twelve times greater or larger than the cross-sectional area $A_1$ of first aperture 104 and the cut-out 118 at first end 112 of second aperture 110 may be about twice the area $A_1$ of first aperture 104. As such, first aperture 104 has a minimum cross-sectional area $A_1$ and second aperture 110 has a minimum cross-sectional area $A_2$. Further, in such embodiments, the exit area $A_2$ of cut-out 118 at outer surface 102 may be greater than the minimum cross-sectional area $A_1$, e.g., larger than the smallest cross-sectional area value of first aperture 104 as just described. In other embodiments, first aperture 104 may have a varying cross-sectional area $A_1$ and second aperture 110 may have a constant cross-sectional area $A_2$. In such embodiments, the minimum cross-sectional area $A_1$ of first aperture 104 also may be smaller than the minimum cross-sectional area $A_2$ of second aperture 110.

Although with the top, plan view of FIG. 6 illustrates centers of first aperture 104 and second aperture 110 aligned with respect to an axis H-H, first aperture 104 and second aperture 110 need not be aligned. For example, as shown in FIGS. 7 and 8, first and second apertures 104, 110 may be defined such that a centerline $CL_2$ of second aperture 110 is aligned with axis H-H but a centerline $CL_1$ of first aperture 104 is aligned with a different axis I-I.

Moreover, each cut-out 118 may have a center 122, and in embodiments such as shown in FIGS. 5 and 6, each cut-out 118 in plies 98 may be aligned such that the center 122 of each cut-out 118 is aligned with each center 122 along second direction $D_2$. In other embodiments, however, cut-outs 118 may be offset from one another with respect to second direction $D_2$ and/or with respect to axis H-H. For example, as illustrated in FIGS. 9 and 10, a center 122 of cut-out 118 of one ply may be offset from the center 122 of cut-out 118 of the successive and/or preceding ply. That is, centers 122 may not be aligned as shown in FIGS. 4 and 5 but, rather, may be misaligned as shown in FIGS. 9 and 10.

As further illustrated in FIGS. 9 and 10, cut-outs 118 of adjacent plies of second plurality of plies 98 may have different shapes and/or cross-sections. More particularly, FIG. 5 illustrates cut-outs 118 as having the same general rectangular or pill shape and uniformly increasing or decreasing in cross-sectional area. However, in other embodiments, adjacent cut-outs 118 may have the same cross-sectional area and/or different shapes. In still other embodiments, any change in cross-sectional area of cut-outs 118 may be non-uniform. As an example, a cut-out 118 in ply A may have a cross-sectional area $A_A$, a cut-out 118 in adjacent ply B may have a cross-sectional area $A_B$, and a cut-out 118 in ply C (adjacent ply B) may have a cross-sectional area $A_C$. Referring to FIG. 9, cross-sectional area $A_A$ of cut-out 118 in ply A may be approximately equal to the cross-sectional area $A_B$ of cut-out 118 in ply B, but cross-sectional area $A_C$ of cut-out 118 in ply C may be smaller than cross-sectional areas $A_A$ and $A_B$. As another example shown in FIG. 10, cross-sectional area $A_B$ of cut-out 118 in ply B may be larger or greater than both cross-sectional area $A_A$ of cut-out 118 in ply A and cross-sectional area $A_C$ of cut-out 118 in ply C. Thus, in the embodiments shown in FIGS. 9 and 10, the change in cross-sectional area of cut-outs 118 from ply A to ply C along second direction $D_2$ is non-uniform.

As previously described, airfoil 80 may be formed from first plurality of plies 96 and second plurality of plies 98. FIG. 11 provides a chart illustrating an exemplary method 800 for fabricating airfoil 80. At step 802 of exemplary method 800, first plurality of plies 96 are laid up, e.g., in or on a layup tool, mandrel, or mold. During the layup generally represented as step 802, a desired component shape may be formed to produce a preform; the layup step or portion of the process thus may be referred to as the layup preforming step. The layup performing step may comprise layering multiple plies or structures, such as plies pre-impregnated (pre-preg) with matrix material, pre-preg tapes, or the like, to form a desired shape of the resultant CMC component or a portion of the resultant CMC component, e.g., first portion 92 of CMC airfoil 80. The layers are stacked to form the layup or preform, which is a precursor to the CMC component. Thus, in exemplary method 800 for forming an airfoil of a gas turbine engine, the layup preforming step 802 comprises laying up a CMC material to form a first portion 92 preform.

The first portion preform comprising first plurality of plies 96 is processed, e.g., compacted in an autoclave, at step 804. After first plurality of plies 96 are processed, second plurality of plies 98 may be laid up or otherwise assembled on first portion 92, as shown at step 806. Then, as illustrated at step 808, second plurality of plies 98 and first portion 92 may be processed, e.g., compacted in an autoclave, to form airfoil 80 having first portion 92 and second portion 94, wherein second portion 94 is adjacent first portion 92. Further, after processing plies 98 and first portion 92, airfoil 80 also may be finish machined as desired, e.g., to form or define the finished shape of airfoil 80.

As described above, a cooling aperture 120 may be defined through first portion 92 and second portion 94 of airfoil 80. More specifically, a first aperture 104 may be defined in first portion 92 from inner surface 100 to second portion 94, and a second aperture 110 may be defined in second portion 94 from first portion 92 to outer surface 102. Together, first aperture 104 and second aperture 110 define cooling aperture 120 extending from inner surface 100 to outer surface 102. As such, a flow of cooling fluid from within airfoil 80 may be directed to outer surface 102 of airfoil 80.

In one embodiment of method 800, first portion 92 may be machined in its green state to define first aperture 104. More particularly, after processing, e.g., after autoclaving, the first portion 92 of airfoil 80 is in a green state, and first aperture 104 may be drilled, machined, or otherwise formed through first portion 92 in its green state. In another embodiment of method 800, before plies 96 are laid up, each ply of first plurality of plies 96 may be cut to define a cut-out 118 in each ply of the first plurality of plies 96. Then, plies 96 having cut-outs in each ply may be laid up and processed to form first portion 92 of airfoil 80. The cut-outs 118 define first aperture 104 through first portion 92. Second aperture 110 similarly may be defined in second portion 94 by defining a cut-out 118 in each ply of second plurality of plies 98. For example, before plies 98 are laid up on first portion 92, each ply may be cut to define cut-out 118 in each ply of second plurality of plies 98. In laying up or assembling second plurality of plies 98 on first portion 92, cut-outs 118 are positioned with respect to first aperture 104 to define cooling aperture 120 through first portion 92 and second plurality of plies 98. In some embodiments, cut-outs 118 can be aligned to define second aperture 110; alternatively, adjacent cut-outs 118 may be offset from one another in defining second aperture 110. Further, in embodiments in which plies 96 and/or 98 are cut to define cut-outs therein, a precision Gerber cutter by Gerber Technology of Tolland, Conn., may be used to cut the plies. However, another type of cutter or other means for defining cut-outs in plies 96, 98 also may be used.

Of course, it will be appreciated that defining first aperture 104 and second aperture 110 may occur at other points within method 800 than as described. For example, plies 98 may be cut as the first plurality of plies 96 are being processed or before the first plurality of plies 96 are laid up to form the first portion 92. As another example, plies 96, 98 may be cut as part of the layup process, e.g., plies 96, 98 may be cut as they are laid up.

Method 800 is provided by way of example only; it will be appreciated that some steps or portions of method 800 may be performed in another order. Additionally, other methods of fabricating or forming airfoil 80 may be used as well.

In particular, other processing cycles, e.g., utilizing other known methods or techniques for compacting CMC plies, may be used. Further, airfoil 80 may be subjected to additional processes as well, e.g., airfoil 80 may undergo densification using a melt infiltration process or a chemical vapor infiltration process. Additionally or alternatively, method 800 may include the use of a matrix of pre-ceramic polymer fired to obtain a ceramic matrix, or any combinations of the foregoing or other known processes.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. An airfoil for a gas turbine engine, the airfoil comprising:
    a first portion defining an inner surface of the airfoil, the first portion formed from a first plurality of plies of a ceramic matrix composite material; and
    a second portion defining an outer surface of the airfoil, the second portion formed from a second plurality of plies of a ceramic matrix composite material,
    wherein the first portion and the second portion define a non-line of sight cooling aperture extending from the inner surface to the outer surface of the airfoil,
    wherein the first portion defines a first aperture and the second portion defines a second aperture, the first aperture and the second aperture forming the cooling aperture, and
    wherein the first aperture has a first minimum cross-sectional area and the second aperture has a second minimum cross-sectional area, the first minimum cross-sectional area being smaller than the second minimum cross-sectional area.

2. The airfoil of claim 1, wherein a surface angle is defined between the second aperture and the outer surface, the surface angle being less than 45°.

3. The airfoil of claim 1, wherein each ply of the first plurality of plies defines a cut-out, the plurality of cut-outs defining the first aperture.

4. The airfoil of claim 1, wherein each ply of the second plurality of plies defines a cut-out, the plurality of cut-outs defining the second aperture.

5. The airfoil of claim 4, wherein the cut-outs of the second plurality of plies increase in cross-sectional area from a first end of the second aperture to a second end of the second aperture.

6. The airfoil of claim 4, wherein each cut-out has a center, and wherein the centers of the cut-outs are aligned along a second direction.

7. The airfoil of claim 4, wherein each cut-out has a center, and wherein the center of one cut-out is offset from the center of an adjacent cut-out.

8. An airfoil for a gas turbine engine, the airfoil comprising:
    a first portion defining an inner surface of the airfoil, the first portion formed from a first plurality of plies of a ceramic matrix composite material; and
    a second portion defining an outer surface of the airfoil, the second portion formed from a second plurality of plies of a ceramic matrix composite material,
    wherein the first portion defines a first aperture and the second portion defines a second aperture, the first aperture and the second aperture extending along different directions,
    wherein the first aperture has a first minimum cross-sectional area and the second aperture has a second minimum cross-sectional area, the first minimum cross-sectional area being smaller than the second minimum cross-sectional area,
    wherein the first aperture and the second aperture define a cooling aperture forming a continuous pathway through the airfoil from the inner surface to the outer surface, and
    wherein a surface angle is defined between the second aperture and the outer surface, the surface angle being less than 45°.

9. The airfoil of claim 8, wherein each ply of the second plurality of plies defines a cut-out, the cut-outs increasing in cross-sectional area from the first portion to the outer surface, and wherein the plurality of cut-outs defines the second aperture.

10. A method for forming an airfoil for a gas turbine engine, the method comprising:
    laying up a first plurality of plies of a ceramic matrix composite material;
    processing the first plurality of plies to form a first portion of the airfoil;
    laying up a second plurality of plies of a ceramic matrix composite material, the second plurality of plies laid up on the first portion of the airfoil; and processing the second plurality of plies and the first portion to form a second portion of the airfoil adjacent the first portion, wherein the first and second portions define a non-line of sight cooling aperture, wherein the first portion defines a first aperture and the second portion defines a second aperture, the first aperture and the second aperture forming the cooling aperture, and wherein the first aperture has a first minimum cross-sectional area and the second aperture has a second minimum cross-sectional area, the first minimum cross-sectional area being smaller than the second minimum cross-sectional area.

11. The method of claim 10, further comprising defining the first aperture through the first portion before laying up the second plurality of plies on the first portion, wherein the first aperture is defined by machining the first aperture.

12. The method of claim 10, further comprising defining a cut-out in each ply of the first plurality of plies, the cut-outs defining the first aperture.

13. The method of claim 10, further comprising defining a cut-out in each ply of the second plurality of plies, the cut-outs defining the second aperture.

14. The method of claim 13, wherein the cut-outs of the second plurality of plies are aligned to define the second aperture.

15. The method of claim 10, wherein the first aperture extends along a first direction and the second aperture extends along a second direction, the first direction different from the second direction.

16. The method of claim 10, wherein the second portion defines an outer surface of the airfoil, and wherein a surface angle is defined between the second aperture and the outer surface, the surface angle being less than 45°.

* * * * *